(12) United States Patent
Wolfram et al.

(10) Patent No.: US 9,908,950 B2
(45) Date of Patent: Mar. 6, 2018

(54) HIGH-PRESSURE POLYMERIZATION PROCESS OF ETHYLENICALLY UNSATURATED MONOMERS

(71) Applicant: Basell Polyolefine GmbH, Wesseling (DE)

(72) Inventors: Sven Wolfram, Euskirchen (DE); Andre-Armand Finette, Cologne (DE); Udo Backes, Mechernich (DE); Andrei Gonioukh, Erftstadt (DE); Hicran Cabuk, Troisdorf (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/550,256

(22) PCT Filed: Feb. 22, 2016

(86) PCT No.: PCT/EP2016/053628
§ 371 (c)(1),
(2) Date: Aug. 10, 2017

(87) PCT Pub. No.: WO2016/135077
PCT Pub. Date: Sep. 1, 2016

(65) Prior Publication Data
US 2018/0030160 A1  Feb. 1, 2018

(30) Foreign Application Priority Data

Feb. 23, 2015  (EP) .................................... 15156146

(51) Int. Cl.
C08F 2/01 (2006.01)
C08F 210/02 (2006.01)
(Continued)

(52) U.S. Cl.
CPC ............. *C08F 2/01* (2013.01); *B01J 19/0006* (2013.01); *B01J 19/2415* (2013.01);
(Continued)

(58) Field of Classification Search
CPC ...... C08F 2/01; C08F 210/02; G01L 19/0092; B01J 2219/00065; B01J 2219/00211; B01J 2219/00337
(Continued)

(56) References Cited

U.S. PATENT DOCUMENTS 3,294,773 A * 12/1966 Gans ...................... B01J 19/243
526/61
8,048,971 B2   11/2011 Goossens et al.
(Continued)

FOREIGN PATENT DOCUMENTS

KR     20090024163 A     3/2009
WO     WO-2010081684 A1  7/2010

OTHER PUBLICATIONS

The International Search Report and Written Opinion for PCT/EP2016/053628 dated May 19, 2016.

*Primary Examiner* — Fred M Teskin (57) ABSTRACT

A process for polymerizing or copolymerizing ethylenically unsaturated monomers in the presence of free-radical polymerization initiators, wherein the polymerization is carried out at temperatures from 100° C. to 350° C. and pressures in the range of from 110 MPa to 500 MPa in a continuously operated polymerization reactor which is controlled by a pressure control valve at the outlet of the polymerization reactor, the process comprising continuously monitoring the pressure within the polymerization reactor, feeding a pressure signal to a controller for controlling the control valve and having the controller altering the opening of the pressure control valve to control the pressure within the polymerization reactor, wherein the controller starts an
(Continued)

emergency shutdown program when the pressure control valve closes more than a preset threshold value and the pressure within the polymerization reactor decreases below a preset pressure threshold.

19 Claims, 1 Drawing Sheet

(51) Int. Cl.
- *B01J 19/24* (2006.01)
- *G01L 19/00* (2006.01)
- *B01J 19/00* (2006.01)
- *C08F 2/38* (2006.01)

(52) U.S. Cl.
CPC ........ *C08F 210/02* (2013.01); *G01L 19/0092* (2013.01); *B01J 2219/00051* (2013.01); *B01J 2219/00065* (2013.01); *B01J 2219/00211* (2013.01); *B01J 2219/00337* (2013.01)

(58) Field of Classification Search
USPC .......................................................... 526/61
See application file for complete search history.

(56) References Cited

U.S. PATENT DOCUMENTS

| | | | |
|---|---|---|---|
| 8,273,835 B2 * | 9/2012 | Littmann | ................ B01J 4/008 422/134 |
| 2002/0132936 A1 | 9/2002 | Kendrick et al. | |
| 2011/0301307 A1 | 12/2011 | Littmann et al. | |

* cited by examiner

HIGH-PRESSURE POLYMERIZATION PROCESS OF ETHYLENICALLY UNSATURATED MONOMERS

This application is the U.S. National Phase of PCT International Application PCT/EP2016/053628, filed Feb. 22, 2016, claiming benefit of priority to European Patent Application No. 15156146.1, filed Feb. 23, 2015, the disclosures of which are incorporated herein by reference in their entirety.

FIELD OF THE INVENTION

The present disclosure provides a process for polymerizing or copolymerizing ethylenically unsaturated monomers in the presence of free-radical polymerization initiators at temperatures from 100° C. to 350° C. and pressures in the range of from 110 MPa to 500 MPa in a continuously operated polymerization reactor.

BACKGROUND OF THE INVENTION

Polyethylene is the most widely used commercial polymer. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE).

A common set-up of a plant for preparing low density polyethylene comprises, beside a polymerization reactor which can be an autoclave or a tubular reactor or a combination of such reactors, further equipment. For pressurizing the reaction components, a set of two compressors, a primary compressor and a secondary compressor, may be used. At the end of the polymerization sequence, a high-pressure polymerization unit may further include apparatuses like extruders and granulators for pelletizing the obtained polymer. Furthermore, such a polymerization unit may also comprise means for feeding monomers and comonomers, free-radical initiators, modifiers or other substances at one or more positions to the polymerization reaction.

A characteristic of the radically initiated polymerization of ethylenically unsaturated monomers under high pressure is that the conversion of the monomers is by far not complete. Per pass of the reactor or the reactor combination, only about 10% to 50% of the dosed monomers are converted in case of a polymerization in a tubular reactor and from 8% to 30% of the dosed monomers are converted in case of a polymerization in an autoclave reactor. The obtained reaction mixture may leave the reactor through a pressure control valve and may then be separated into polymeric and gaseous components with the unreacted monomers being recycled. To avoid unneeded decompression and compression steps, the separation into polymeric and gaseous components may be carried out in two stages. The monomer-polymer mixture leaving the reactor is transferred to a first separating vessel, which may also be designated as high-pressure product separator, in which the separation in polymeric and gaseous components is carried out at a pressure that allows recycling the ethylene and comonomers separated from the monomer-polymer mixture to the reaction mixture at a position between the primary compressor and the secondary compressor. At the conditions of operating the first separation vessel, the polymeric components within the separating vessel are in liquid state. The liquid phase obtained in the first separating vessel is transferred to a second separation vessel, which may also be designated as low-pressure product separator, in which a further separation in polymeric and gaseous components takes place at lower pressure. The ethylene and comonomers separated from the mixture in the second separation vessel are fed to the primary compressor where these monomers are compressed to the pressure of the fresh ethylene feed, combined with the fresh ethylene feed and the joined streams are further pressurized to the pressure of the high-pressure gas recycle stream.

The polymerization process in a tubular LDPE reactor is carried out at high pressures which can reach even 350 MPa. Such high pressure requires special technology for the process to be handled in a safe and reliable manner. Technical issues in handling ethylene at high pressures are, for example, described in Chem. Ing. Tech. 67 (1995), pages 862 to 864. It is stated that ethylene decomposes rapidly in an explosive manner under certain temperature and pressure conditions to give soot, methane and hydrogen. This undesired reaction occurs repeatedly in the high-pressure polymerization of ethylene. The drastic increase in pressure and temperature associated therewith represents a considerable potential risk for the operational safety of the production plants.

A possible solution for preventing a drastic increase in pressure and temperature of this type consists in installing rupture discs or emergency pressure-relief valves. WO 02/01308 A2, for example, discloses a specific hydraulically controlled pressure relief valve which allows a particularly fast opening of the pressure relief valve in case of sudden changes in pressure or temperature. It is accordingly technically possible to handle such thermal runaways or explosive decompositions of ethylene within the polymerization reactor, however these situations are highly undesirable since thermal runaways or explosive decompositions of ethylene within the polymerization reactor the lead to a shut-down of the polymerization plant with possible emission of ethylene into the environment and loss of production.

Another threat to the operational safety of high-pressure polymerization plants is the occurrence of leaks. Due to the high pressure difference between the interior of the polymerization reactor and the surrounding, even small fissures in the reactor wall may lead to an exit of a considerably high amount of the reactor content resulting in locally high concentrations of inflammable hydrocarbon in a short time period.

Simply measuring the pressure in the polymerization reactor does not work for identifying leaks in the polymerization reactor because on the one hand the secondary compressor continuously presses new monomer into the reactor and on the other hand the pressure control valve is programmed to keep the pressure in the reactor constant. WO 2008/148758 A1 discloses a method of operating a high-pressure ethylene polymerization unit comprising a tubular reactor equipped with a cooling jacket, in which method the leakage of reaction mixture into the cooling jacket is controlled by monitoring the electrical conductivity of the aqueous cooling medium. Such a method however requires that at least one of the chemical substances in the reaction mixture changes the electrical conductivity of the aqueous cooling medium. Furthermore, leakage can also occur at positions of the polymerization reactor which are not covered by a cooling jacket.

Accordingly, there is a need to provide a process which allows a very fast detection of leaks in a high-pressure polymerization plant and in this way permits to avoid the built-up of explosive hydrocarbon gas/oxygen mixtures.

Furthermore, the detection method should be very reliable and trustworthy and should be easy to implement in existing polymerization plants.

SUMMARY OF THE INVENTION

The present disclosure provides a process for polymerizing or copolymerizing ethylenically unsaturated monomers in the presence of free-radical polymerization initiators, wherein the polymerization is carried out at temperatures from 100° C. to 350° C. and pressures in the range of from 110 MPa to 500 MPa in a continuously operated polymerization reactor which is controlled by a pressure control valve at the outlet of the polymerization reactor and the monomer mixture is brought to the polymerization pressure by a combination of a primary compressor and a secondary compressor, the process comprising continuously monitoring the pressure within the polymerization reactor by one or more pressure sensors creating a pressure signal indicative of the pressure within the polymerization reactor, feeding the pressure signal to a controller for controlling the control valve and having the controller altering the opening of the pressure control valve to control the pressure within the polymerization reactor, wherein the controller starts an emergency shutdown program when the pressure control valve closes more than a preset threshold value and the pressure within the polymerization reactor decreases below a preset pressure threshold.

In some embodiments, the controller starts an emergency shutdown program under conditions where the secondary compressor is operating.

In some embodiments, the polymerization is carried out in one or more tubular reactors or in one or more autoclave reactors or in combinations of such reactors.

In some embodiments, the polymerization reactor is a tubular reactor.

In some embodiments, the pressure within the polymerization reactor is monitored at the inlet of the polymerization reactor.

In some embodiments, the pressure is monitored by two or more pressure sensors which are located at the same position and an average pressure value, which is calculated as middle value for the pressures measured by the two or three pressure sensors, is regarded as pressure signal indicative of the pressure within the polymerization reactor.

In some embodiments, the emergency shutdown program releases the content of the reactor including pre-heater and post reactor cooler and the content of the secondary compressor including high-pressure gas recycle line and high-pressure product separator reactor to the atmosphere.

In some embodiments, the emergency shutdown program first activates a deluge or sprinkler system which sprays water on the polymerization reactor before releasing the content of the reactor and the secondary compressor to the atmosphere.

In some embodiments, the deluge or sprinkler system comprises a supporting structure, pumps, pipes and nozzles which are distributed along the reactor.

In some embodiments, the controller outputs an alarming signal when the pressure control valve closes more than a preset threshold value and the pressure is above the preset pressure threshold.

DETAILED DESCRIPTION OF THE INVENTION

The present disclosure refers to a process for polymerizing or copolymerizing ethylenically unsaturated monomers in the presence of free-radical polymerization initiators in a continuously operated polymerization reactor, which can also be a combination of polymerization reactors, at temperatures from 100° C. to 350° C. and pressures in the range of from 110 MPa to 500 MPa. In some embodiments, the present disclosure refers to such a process, in which the pressure is controlled by a pressure control valve at the outlet of the polymerization reactor.

The high-pressure polymerization may comprise a homopolymerization of ethylene or a copolymerization of ethylene with one or more other monomers, provided that these monomers are free-radically copolymerizable with ethylene under high pressure. Examples of copolymerizable monomers are α,β-unsaturated $C_3$-$C_8$-carboxylic acids, such as maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, including esters of $C_1$-$C_6$-alkanols, or anhydrides, methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, such as vinyl acetate, can be used as comonomers. In some embodiments, propene, 1-butene, 1-hexene, acrylic acid, n-butyl acrylate, tert-butyl acrylate, 2-ethylhexyl acrylate, vinyl acetate or vinyl propionate may be used as a comonomer.

In the case of copolymerization, the proportion of comonomer or comonomers in the reaction mixture is from 1 to 50% by weight, or from 3 to 40% by weight, based on the amount of monomers, i.e. the sum of ethylene and other monomers. Depending on the type of comonomer, it is possible to feed the comonomers at more than one point to the reactor set-up. In an embodiment, the comonomers are fed to the suction side of the secondary compressor.

For the purposes of the present disclosure, polymers or polymeric materials are substances which are made up of at least two monomer units. The polymers or polymeric materials may be low density polyethylenes having an average molecular weight $M_n$ of more than 20 000 g/mole. The term low density polyethylene is meant to include ethylene homopolymers and ethylene copolymers. The process of the present disclosure can also be employed in the preparation of oligomers, waxes and polymers having a molecular weight $M_n$ of less than 20 000 g/mole.

Possible initiators for starting the free-radical polymerization in the respective reaction zones are in general substances that can produce radical species under the conditions in the polymerization reactor, for example, oxygen, air, azo compounds or peroxidic polymerization initiators. In an embodiment of the disclosure, the polymerization is carried out by using oxygen, either fed in the form of pure $O_2$ or as air. In case of initiating the polymerization with oxygen, the initiator may be first mixed with the ethylene feed and then fed to the reactor. In such a case, it is not only possible to feed a stream comprising monomer and oxygen to the beginning of the polymerization reactor but also to one or more points along the reactor creating two or more reaction zones. In an embodiment of the present disclosure, initiation occurs by using organic peroxides or azo compounds. Examples of organic peroxides which can be employed in the process of the present disclosure are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoyl-peroxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di (tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2, 2-tetramethylethane derivatives, are further examples. It is possible to use either individual initiators or mixtures of various initiators. A large range of initiators, including peroxides, are commercially available, for example the products of Akzo Nobel offered under the trade names Trigonox® or Perkadox®.

The peroxidic polymerization initiators may be, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di (tert-butylperoxy)hexane, tert-butyl cumyl peroxide, di-tert-butyl peroxide and 2,5-dimethyl-2,5-di(tert-butylperoxy) hex-3-yne, or the peroxidic polymerization initiators are tert-butyl peroxy-3,5,5-trimethylhexanoate, di-(2-ethylhexyl)peroxydicarbonate or tert-butyl peroxy-2-ethylhexanoate.

The initiators can be employed individually or as a mixture in concentrations of from 0.1 mol/t to 50 mol/t of polyethylene produced, including from 0.2 mol/t to 20 mol/t, in each reaction zone. In an embodiment of the present disclosure, the free-radical polymerization initiator, which is fed to a reaction zone, is a mixture of at least two different azo compounds or organic peroxides. If such initiator mixtures are used, these mixtures can be fed to all reaction zones. There is no limit for the number of different initiators in such a mixture. The mixtures can be composed of from two to six, including two, three or four different initiators. The mixtures of initiators can have different decomposition temperatures.

The initiators can be used in the dissolved state. The solvents can be ketones and aliphatic hydrocarbons, such as octane, decane and isododecane and also other saturated $C_8$-$C_{25}$-hydrocarbons. The solutions comprise the initiators or initiator mixtures in proportions of from 2 to 65% by weight, or from 5 to 40% by weight or from 8 to 30% by weight.

In the high-pressure polymerization, the molecular weight of the polymers to be prepared can be altered by addition of modifiers which act as chain-transfers agents. Examples of modifiers are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. It is possible to use saturated aliphatic aldehydes, such as propionaldehyde or 1-olefins such as propene, 1-butene or 1-hexene, or aliphatic hydrocarbons such as propane.

The high-pressure polymerization is carried out at pressures of from 110 MPa to 500 MPa, or at pressures of from 160 MPa to 350 MPa, or at pressures of from 200 MPa to 330 MPa for polymerization in a tubular reactor and with pressures of from 110 MPa to 300 MPa, or pressures of from 120 MPa to 280 MPa for polymerization in an autoclave reactor. In some embodiments, the polymerization temperatures are in the range of from 100° C. to 350° C., or from 180° C. to 340° C., or from 200° C. to 330° C. for polymerization in a tubular reactor and in the range of from 110° C. to 320° C. or from 120° C. to 310° C. for polymerization in an autoclave reactor.

The polymerization can be carried out with all types of high-pressure reactors appropriate for high-pressure polymerization. Such high-pressure reactors are, for example, tubular reactors or autoclave reactors. The polymerization may be carried out in one or more tubular reactors or one or more autoclave reactors or combinations of such reactors. In an embodiment of the present disclosure, the polymerization reactor is a tubular reactor.

Common high-pressure autoclave reactors are stirred reactors and have a length-to-diameter ratio of in the range from 2 to 30, or from 2 to 20. Such autoclave reactors have one or more reaction zones, or from 1 to 6 reaction zones, or from 1 to 4 reaction zones. The number of reaction zones depends from the number of agitator baffles which separate individual mixed zones within the autoclave reactor.

Appropriate tubular reactors are basically long, thick-walled pipes, which may be from about 0.5 km to 4 km, or from 1 km to 3 km, r from 1.5 km to 2.5 km long. The inner diameter of the pipes may be in the range of from about 30 mm to 120 mm or from 60 mm to 100 mm. Such tubular reactors may have a length-to-diameter ratio of greater than 1000, or from 10000 to 40000 or from 25000 to 35000.

The tubular reactors may have at least two reaction zones, or from 2 to 6 reaction zones, or from 2 to 5 reaction zones. The number of reaction zones is given by the number of feeding points for the initiator. Such a feeding point can, for example, be an injection point for a solution of azo compounds or organic peroxides. Fresh initiator is added to the reactor, where the initiator decomposes into free radicals and initiates further polymerization. The generated heat of the reaction rises the temperature of the reaction mixture, since more heat is generated than can be removed through the walls of the tubular reactor. The rising temperature increases the rate of decomposition of the free-radical initiators and accelerates polymerization until all of the free-radical initiator is consumed. Thereafter no further heat is generated and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises and accordingly allows adjusting that value. The temperature rise may be set to be in the range of from 70° C. to 170° C. in the first reaction zone and 50° C. to 130° C. for the subsequent reaction zones depending on the product specifications and the reactor configuration.

The compression of the reaction gas composition to the polymerization pressure may be carried out by at least two sequentially operating compressors of which a primary compressor first compresses the reaction gas composition to a pressure of from 10 MPa to 50 MPa and a secondary compressor, which is sometimes designated as hyper compressor, then further compresses the reaction gas composition to the polymerization pressure of from 110 MPa to 500 MPa. The primary compressor and the secondary compressor may be multistage compressors. It is further possible to separate one or more stages of one or both of these compressors and divide the stages into separated compressors. Also a series of one primary compressor and one secondary compressor can be used for compressing the reaction gas composition to the polymerization pressure. In such cases, sometimes the whole primary compressor is designated as primary compressor. However, it is also common to designate the one or more first stages of the primary compressor, which compress the recycle gas from the low-pressure product separator to the pressure of the fresh ethylene feed, as booster compressor and then designate the one or more subsequent stages as the primary compressor although the booster compressor and the subsequent stages are part of one apparatus.

The polymerization apparatus may comprise, beside the polymerization reactor, a high-pressure gas recycle line and a low-pressure gas recycle line for recycling not reacted monomers to the polymerization process. The reaction mixture obtained in the polymerization reactor is transferred to a first separation vessel, which may also be designated as high-pressure product separator, and separated into a gaseous fraction and a liquid fraction at a pressure of from 15 MPa to 50 MPa. The gaseous fraction withdrawn from the first separation vessel is fed via the high-pressure gas recycle line to the suction side of the secondary compressor. In the high-pressure gas recycle line, the gas may be purified by several purifications steps from undesired components such as entrained polymer or oligomers. The liquid fraction withdrawn from the first separation vessel, which may still comprise dissolved monomers such as ethylene and comonomers in an amount of 20 to 40% of weight, is transferred to a second separation vessel, which may also be designated as low-pressure product separator, and further separated, at reduced pressure, which may be an absolute pressure in the range of from 0.1 to 0.5 MPa, in polymeric and gaseous components. The gaseous fraction withdrawn from the second separation vessel is fed via the low-pressure gas recycle line to the primary compressor, for example to the foremost of the stages. Also the low-pressure gas recycle line may comprise several purifications steps for purifying the gas from undesired components.

The recycled gas coming from the low-pressure gas recycle line may be compressed by the first stages of the primary compressor to the pressure of the fresh feed of ethylenically unsaturated monomers, for example ethylene, thereafter combined with the fresh gas feed and the combined gases are further compressed in the primary compressor to a pressure of from 10 MPa to 50 MPa. The primary compressor may comprise five or six compression stages, two or three before adding the fresh gas and two or three after adding the fresh gas. The secondary compressor may have two stages; a first stage, which compresses the gas from about 30 MPa to about 120 MPa, and a second stage, which further compresses the gas from about 120 MPa to the final polymerization pressure.

In the polymerization process of the present disclosure, the pressure within the polymerization reactor is controlled by a pressure control valve arranged at the outlet of the polymerization reactor. The sensors for measuring the pressure can be arranged at various positions of the polymerization reactor. It is also possible to have pressure sensors at more than one position. In an embodiment of the present disclosure, two or more sensors are located at the same position and an average pressure value, which is calculated as the middle value for the pressures measured by the two or more pressure sensors, is regarded as the pressure signal indicative of the pressure within the polymerization reactor. Two or three pressure sensors may be used to calculate the average pressure value. However, it is also possible to operate the process of the present disclosure with one sensor for measuring the reactor pressure. The pressure signals provided by the pressure sensors may be fed to a controller which controls the pressure control valve. The pressure measured at the inlet of the polymerization reactor may be used as a signal for controlling the pressure control valve. However, it is also possible to measure the pressure at a side feed stream such as an initiator feed stream. The pressure control valve can be any valve arrangement which allows for letting down the pressure of the reaction mixture leaving the reactor to the pressure within the first separation vessel. The controller varies the valve opening of the pressure control valve based on the received pressure signals. Since the secondary compressor continuously delivers monomer into the polymerization reactor at a constant rate, a reduction in the valve opening of the pressure control valve induces an increase in the pressure within the polymerization reactor while an opening of the pressure control valve reduces the pressure within the polymerization reactor. The pressure control valve can be operated separately from the process control system, which controls the high-pressure polymerization plant, or it can be operated as integral part of this process control system.

In the case of a tubular reactor, heat removal is greatly inhibited by a laminar boundary layer having a high polymer content at the wall. For removing the layer, it is common practice to briefly open the pressure control valve at the reactor outlet at constant time intervals which can be in the range of from every 10 seconds to once every few hours. The boundary layer is then detached and carried out by the turbulence of the outflowing reaction mixture. As a result, the pressure within the reactor firstly drops and then, after reactivation of the pressure control circuit, approaches the set value again. The process of periodically opening the pressure control valve for a short time period to remove the boundary layer may also be designated as "kicking" or "bumping".

Figure 1:
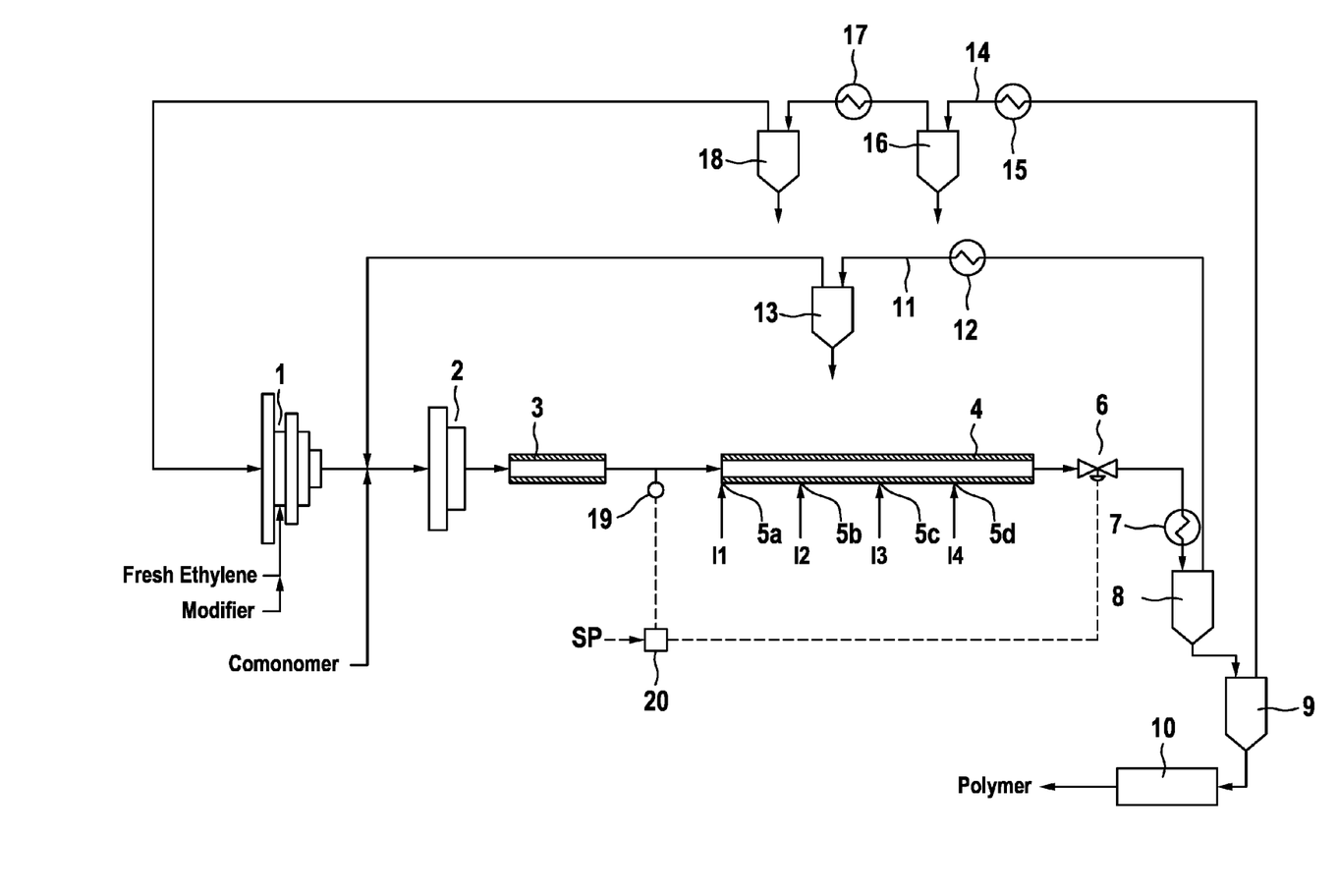
FIG. 1 shows schematically a typical set-up of a polymerization reactor for carrying out the process of the present disclosure without restricting the disclosure to the embodiments described therein.

FIG. 1 shows schematically a typical set-up for a suitable tubular polymerization reactor without however restricting the disclosure to the embodiments described therein.

The fresh ethylene, which may be under a pressure of 1.7 MPa, is firstly compressed to a pressure of about 30 MPa by means of a primary compressor (1) and then compressed to the reaction pressure of about 300 MPa using a secondary compressor (2). The molecular weight regulator is added to primary compressor (1). The reaction mixture leaving the primary compressor (2) is fed to pre-heater (3), where the reaction mixture is preheated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). The tubular reactor (4) shown in FIG. 1 has four spatially separated initiator injection points (5a), (5b), (5c), and (5d) for feeding initiators or initiator mixtures I1, I2, I3, and I4 to the reactor and accordingly also four reaction zones. By feeding free-radical initiators, which decompose at the temperature of the reaction mixture, to the tubular reactor the polymerization reaction starts. The reaction mixture leaves the tubular reactor (4) through pressure control valve (6) and passes a post reactor cooler (7). Thereafter, the resulting polymer is separated off from unreacted ethylene and other low molecular weight compounds (monomers, oligomers, polymers, additives, solvent, etc.) by means of a first separation vessel (8) and a second separation vessel (9), discharged and pelletized via an extruder and granulator (10).

The ethylene and comonomers which have been separated off in the first separation vessel (8) are fed back to the inlet end of the tube reactor (4) in the high-pressure circuit (11) at 30 MPa. The ethylene and comonomers are first freed from other constituents in at least one purification stage and then added to the monomer stream between primary compressor (1) and secondary compressor (2). FIG. 1 shows one purification stage consisting of a heat exchanger (12) and a separator (13). It is however also possible to use a plurality of purification stages. The high-pressure circuit (11) may separate waxes.

The ethylene which has been separated off in the second separation vessel (9), which further comprises, inter alia, the major part of the low molecular weight products of the polymerization (oligomers) and the solvent, is worked up in the low-pressure circuit (14) at an absolute pressure of from about 0.1 to 0.5 MPa in a plurality of separators with a heat exchanger being located between each of the separators. FIG. 1 shows two purification stages consisting of heat exchangers (15) and (17) and separators (16) and (18). However, it is also possible to use one purification stage or to use more than two purification stages. The low-pressure circuit (14) may separate oil and waxes.

The pressure of the preheated reaction mixture leaving pre-heater (3) is measured by pressure sensor (19) at a position between pre-heater (3) and tubular reactor (4). Pressure sensor (19) delivers a signal indicative of the measured pressure to controller (20). Based on the pressure signal received from pressure sensor (19) and a setpoint (SP) indicative of the needed pressure within the polymerization reactor (4), controller (20) controls the pressure within polymerization reactor (4) by adjusting the valve opening of the pressure control valve (6).

Different configurations for tubular polymerization reactors are also possible. The monomers can be added at the inlet of the reactor tube or the monomers can be fed, for example cooled, at a plurality of different points to the reactor. This may be done at the beginning of further reaction zones; for example if oxygen or air is used as initiators, which can be added to the monomer feed in the primary compressor.

The process of the present disclosure relates to a polymerization process in which an emergency shutdown program is started when the pressure control valve closes more than a preset threshold value and the pressure within the polymerization reactor decreases below a preset pressure threshold as long as the secondary compressor is operating. An emergency shutdown program is a pre-implemented procedure in which the whole polymerization plant or parts of the polymerization plant are depressurized or partly pressurized and the polymerization process is interrupted. The emergency shutdown program may release the content of the reactor including pre-heater and post reactor cooler and the content of the secondary compressor including high-pressure gas recycle line and high-pressure product separator reactor to the atmosphere.

The emergency shutdown program is started when the pressure control valve closes more than a preset threshold value and at the same time the pressure within the polymerization reactor decreases below a preset pressure threshold. The feeding rate of secondary compressors installed in high-pressure polymerization plants can only be varied in very limited form. That means, as long as the secondary compressor is operating, it presses the nameplate amount of material into the polymerization reactor. In continuous operation, the pressure within the polymerization reactor can be kept constant if the same amount of material leaves the reactor as is introduced into the reactor. That means for an individual high-pressure polymerization plant that, in steady state production, the valve opening of the pressure control valve remains constant, while of course the degree of opening is specific for each individual combination of installed compressor set-up, pressure control valve and use of other feed streams. If the pressure control valve closes more than this specific valve opening, steady state conditions are left. Such a situation could occur if the reactor shuts down or if the plant transitions from one polymerization grade, which is produced at a lower pressure, to a polymerization grade, which is produced at a higher pressure. However, as long as the secondary compressor is still operating, this should correspond to an increase in the pressure within the polymerization reactor. If in parallel to a decrease in the valve opening of the pressure control valve also a decrease in the pressure within the polymerization reactor is detected, this is an unambiguous indication of an uncontrolled leakage of reaction mixture from the polymerization reactor or from a piping at the discharge side of the secondary compressor.

The process of the present disclosure allows for the rapid detection of leaks in a high-pressure polymerization plant because measuring the pressure and monitoring the opening degree of a valve are very fast processes. Accordingly, it is possible to shut down the plant before large amounts of the reaction mixture are leaked from the high-pressure part of the plant, which may prevent an explosive hydrocarbon gas/oxygen mixture build up. The process of the present disclosure is very reliable and trustworthy and is easy to implement in existing polymerization plants because the equipment, which is used to detect the leakage and to start the emergency shutdown program, is key equipment, which needs to be functional to operate the polymerization plant, and similarly the process parameters, which are employed for detecting the leakage and starting the emergency shutdown program, are key process parameters.

In an embodiment of the present disclosure, the polymerization reactor is a tubular reactor or comprises a tubular reactor. The polymerization process can then be carried out with briefly opening the pressure control valve at the reactor outlet at constant time intervals, i.e. that the polymerization reactor is kicked or bumped. The short pressure drops within the polymerization reactor induced by the kicking does not interfere with the leakage detection of the process of the present disclosure because this fall of the reactor pressure correlates with an opening of the pressure control valve.

The continuous monitoring of the pressure within the polymerization reactor can be performed at various positions of the polymerization reactor. Even in a tubular reactor, a pressure drop caused by a leakage of reaction mixture spreads fast enough through the reactor that all positions along the reactor tube can be selected for a very fast detection of leaks in a high-pressure polymerization plant. The pressure may also be monitored at the inlet of the polymerization reactor, i.e. at the discharge side of the secondary compressor before the reaction mixture enters the polymerization reactor because polymer has not yet been formed at this position and the probability of a blockage of a pressure sensor by a polymer layer is minimized. Furthermore, the pressure variations caused by the constant brief openings of the pressure control valve are less pronounced at the inlet of the polymerization reactor than in the vicinity of the pressure control valve and hence the mechanical stress for the pressure sensor and consequently the risk of a failure of this component are reduced.

In an embodiment of the present disclosure, the emergency shutdown program, which is started after the pressure control valve closes more than the preset threshold value and the pressure within the polymerization reactor decreases below the preset pressure threshold, first activates a deluge or sprinkler system which sprays or otherwise provides water on the polymerization reactor before the content of the reactor is released to the atmosphere. The water getting in contact with the hot polymerization reactor immediately evaporates and the expanding vapor on the one hand dilutes possibly leaking hydrocarbon gas and on the other hand displaces the oxygen in the vicinity of the polymerization reactor. Thus, the probability that reactor content released to the atmosphere by the emergency shut-down program and possibly leaked reactor mixture combine in the vicinity of the hot polymerization reactor to an event of even higher risk potential is drastically reduced. In addition, the water cools the supporting structure which carries the tubular reactor parts. In an embodiment, the deluge or sprinkler system comprises a supporting structure, pumps, pipes and nozzles which are distributed along the reactor. The program steps for providing water to the reactor can be initiated either prior or shortly after the initiation of the program steps for releasing the pressure within the reactor.

The controller may also emit an alarming signal when the pressure control valve closes more than a preset threshold value and the pressure is above the preset pressure threshold. Such a situation could occur if the pressure control valve is worn out. It could then happen that the pressure control valve has to close more than the preset threshold value to keep the pressure of steady state operations. However, the emergency shutdown program would not be started because the pressure within the polymerization plant would remain above the pressure threshold. The alarming signal output when the pressure control valve closes more than the preset threshold value and the pressure is above the preset pressure threshold can then be used for preventive maintenance of the polymerization plant.

EXAMPLE

A continuous polymerization of ethylene as ethylenically unsaturated monomer was carried out in a high-pressure tubular reactor of the design shown in FIG. 1 having in total a length of 1800 m and a diameter of 62 mm. The controller (20) for controlling the pressure control valve (6) was fed with a pressure signal coming from 3 pressure sensors (19) arranged between pre-heater (3) and tubular reactor (4). The peroxidic polymerization initiators were metered into the tubular reactor at four positions via injection points (5a), (5b), (5c), and (5d), using isododecane as additional solvent. Propionaldehyde was added as molecular weight regulator to the fresh ethylene stream entering the primary compressor (1) in an amount of 1.5 to 2 kg per ton of produced polyethylene. The secondary compressor (2) was operated with an ethylene throughput of 88 metric tons/h. The polymerizations were carried out at a reactor inlet pressure of 280 MPa, corresponding to an opening of the pressure control valve of 91%. For removing laminar boundary layers, the pressure control valve was briefly opened to an opening of 85% every 30 seconds, resulting in a temporary drop of the pressure at the reactor inlet to 265 MPa.

While conducting a steady-state polymerization, a piece of equipment failed resulting in a severe leakage of reaction medium. The leakage was detected about 30 seconds after the incident.

Retrospective analysis of the reactor conditions gave that the pressure control valve started to close immediately after the incident and reached an opening of 100%, i.e. full closure, already 6 s after the incident. In parallel, also the pressure at the reactor inlet started to drop immediately after the incident. Within 6 s from the incident, the pressure had dropped to 270 MPa.

By selecting threshold values of 100% for the pressure control valve opening and 270 MPa for the reactor pressure, a controller according to the process of the present disclosure would have started an emergency shutdown program 6 sec after the incident.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

The invention claimed is:

1. A process for polymerizing or copolymerizing ethylenically unsaturated monomers in the presence of free-radical polymerization initiators, wherein the polymerization is carried out at temperatures from 100° C. to 350° C. and pressures in a range of from 110 MPa to 500 MPa in a continuously operated polymerization reactor which is controlled by a pressure control valve at the outlet of the polymerization reactor and the monomer mixture is brought to the polymerization pressure by a combination of a primary compressor and a secondary compressor, the process comprising continuously monitoring the pressure within the polymerization reactor by one or more pressure sensors creating a pressure signal indicative of the pressure within the polymerization reactor, feeding the pressure signal to a controller for controlling the control valve and having the controller altering the opening of the pressure control valve to control the pressure within the polymerization reactor, wherein the controller starts an emergency shutdown program when the pressure control valve closes more than a preset threshold value and the pressure within the polymerization reactor decreases below a preset pressure threshold.

2. The process of claim 1, wherein the controller starts the emergency shutdown program only as long as the secondary compressor is operating.

3. The process of claim 1, wherein the polymerization is carried out in one or more tubular reactors or in one or more autoclave reactors or in combinations thereof.

4. The process of claim 1, wherein the polymerization reactor is a tubular reactor.

5. The process of claim 1, wherein the pressure within the polymerization reactor is monitored at the inlet of the polymerization reactor.

6. The process of claim 1, wherein the pressure is monitored by two or more pressure sensors which are located at the same position and an average pressure value, which is calculated as the middle value for the pressures as measured by the two or three pressure sensors, is indicative of the pressure within the polymerization reactor.

7. The process of claim 1, wherein the emergency shutdown program releases the content of the reactor including the pre-heater and the post reactor cooler, and the content of the secondary compressor including the high-pressure gas recycle line and the high-pressure product separator reactor, to the atmosphere.

8. The process of claim 7, wherein the emergency shutdown program first activates a deluge or sprinkler system which sprays water on the polymerization reactor before releasing the content of the reactor and the secondary compressor to the atmosphere.

9. The process of claim 8, wherein the deluge or sprinkler system comprises a supporting structure, pumps, pipes and nozzles which are distributed along the reactor.

10. The process of claim 1, wherein the controller outputs an alarming signal when the pressure control valve closes more than a preset threshold value and the pressure is above the preset pressure threshold.

11. A process for polymerizing or copolymerizing ethylenically unsaturated monomers in one or more tubular reactors or in one or more autoclave reactors, or in combinations thereof in the presence of free-radical polymerization initiators, wherein the polymerization is carried out at temperatures from 100° C. to 350° C. and pressures from 110 MPa to 500 MPa in a continuously operated polymerization reactor, which is controlled by a pressure control valve at the outlet of the polymerization reactor, and the monomer mixture is brought to the polymerization pressure by a combination of a primary compressor and a secondary compressor, the process comprising continuously monitoring the pressure within the polymerization reactor by one or more pressure sensors creating a pressure signal indicative of the pressure within the polymerization reactor, feeding the pressure signal to a controller for controlling the control valve and having the controller altering the opening of the pressure control valve to control the pressure within the polymerization reactor, wherein the controller starts an emergency shutdown program when the pressure control valve closes more than a preset threshold value, and the pressure within the polymerization reactor decreases below a preset pressure threshold.

12. The process of claim 11, wherein the pressure is monitored by two or more pressure sensors which are located at the same position and an average pressure value, which is calculated as the middle value for the pressures as measured by the two or three pressure sensors, is indicative of the pressure within the polymerization reactor.

13. The process of claim 11, wherein the emergency shutdown program releases the content of the reactor, including the pre-heater and the post reactor cooler, and the content of the secondary compressor, including the high-pressure gas recycle line and the high-pressure product separator reactor, to the atmosphere.

14. The process of claim 13, wherein the emergency shutdown program first activates a deluge or sprinkler system which sprays water on the polymerization reactor before releasing the content of the reactor and the secondary compressor to the atmosphere.

15. The process of claim 14, wherein the deluge or sprinkler system comprises a supporting structure, pumps, pipes and nozzles which are distributed along the reactor.

16. A process for polymerizing or copolymerizing ethylenically unsaturated monomers in one or more tubular reactors, or in one or more autoclave reactors, or in combinations thereof in the presence of free-radical polymerization initiators, wherein the polymerization is carried out at temperatures from 100° C. to 350° C. and pressures from 110 MPa to 500 MPa in a continuously operated polymerization reactor, which is controlled by a pressure control valve at the outlet of the polymerization reactor, and the monomer mixture is brought to the polymerization pressure by a combination of a primary compressor and a secondary compressor, the process comprising continuously monitoring the pressure within the polymerization reactor by one or more pressure sensors, creating a pressure signal indicative of the pressure within the polymerization reactor, feeding the pressure signal to a controller for controlling the control valve and having the controller altering the opening of the pressure control valve to control the pressure within the polymerization reactor, wherein the controller starts an emergency shutdown program when the pressure control valve closes more than a preset threshold value, and the pressure within the polymerization reactor decreases below a preset pressure threshold, wherein the emergency shutdown program releases the content of the reactor including pre-heater and post reactor cooler and the content of the secondary compressor including high-pressure gas recycle line and high-pressure product separator reactor to the atmosphere.

17. The process of claim 16, wherein the emergency shutdown program releases the content of the reactor, including pre-heater and post reactor cooler, and the content of the secondary compressor, including high-pressure gas recycle line and high-pressure product separator reactor, to the atmosphere.

18. The process of claim 17, wherein the emergency shutdown program first activates a deluge or sprinkler system which sprays water on the polymerization reactor before releasing the content of the reactor and the secondary compressor to the atmosphere.

19. The process of claim 18, wherein the deluge or sprinkler system comprises a supporting structure, pumps, pipes and nozzles which are distributed along the reactor.

* * * * *

UNITED STATES PATENT AND TRADEMARK OFFICE
CERTIFICATE OF CORRECTION

Page 1 of 1

PATENT NO. : 9,908,950 B2
APPLICATION NO. : 15/550256
DATED : March 6, 2018
INVENTOR(S) : Wolfram et al.

It is certified that error appears in the above-identified patent and that said Letters Patent is hereby corrected as shown below:

In the Specification

In Column 6, Line 45, delete "from", and insert -- on --.
In Column 9, Line 5, delete "primary compressor", and insert -- secondary compressor --.
In Column 11, Line 24, delete "are", and insert -- is --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*